(12) United States Patent
Leinonen (10) Patent No.: US 8,512,513 B2
(45) Date of Patent: Aug. 20, 2013

(54) METHOD OF AND APPARATUS FOR CONTROLLING THE HEIGHT OF A COLUMN OF MATERIAL IN A VESSEL UPSTREAM OF A PUMP

(75) Inventor: Kimmo Leinonen, Kotka (FI)

(73) Assignee: Sulzer Pumpen AG, Winterthur (CH)

( * ) Notice: Subject to any disclaimer, the term of this patent is extended or adjusted under 35 U.S.C. 154(b) by 401 days.

(21) Appl. No.: 12/671,896

(22) PCT Filed: Jul. 25, 2008

(86) PCT No.: PCT/EP2008/059806
§ 371 (c)(1),
(2), (4) Date: Feb. 2, 2010

(87) PCT Pub. No.: WO2009/019150
PCT Pub. Date: Feb. 12, 2009

(65) Prior Publication Data
US 2010/0258257 A1    Oct. 14, 2010

(51) Int. Cl.
*D21D 5/26* (2006.01)
*F04D 15/00* (2006.01)

(52) U.S. Cl.
USPC .............................. 162/52; 162/61

(58) Field of Classification Search
USPC ................................... 162/52, 61
See application file for complete search history.

(56) References Cited

U.S. PATENT DOCUMENTS

| | | | |
|---|---|---|---|
| 3,253,547 A | 5/1966 | Weis | |
| 5,197,508 A * | 3/1993 | Gottling et al. | 137/1 |
| 6,322,325 B1 | 11/2001 | Belehradek | |
| 2006/0005622 A1 | 1/2006 | Burdi | |
| 2007/0166169 A1* | 7/2007 | Venkatachari et al. | 417/36 |
| 2009/0148306 A1* | 6/2009 | Drechsel et al. | 417/36 |

FOREIGN PATENT DOCUMENTS

| | | |
|---|---|---|
| DE | 296 17 850 U1 | 12/1996 |
| JP | 05106181 A * | 4/1993 |
| WO | WO 2005/088134 A1 | 9/2005 |

OTHER PUBLICATIONS

Japanese to English machine translation of JP 05-106181 A, 1993.*
Driedger Walter, Controlling Centrifugal Pumps, Hydrocarbon Processing, 1995 (republished online 2000).*

* cited by examiner

*Primary Examiner* — Anthony Calandra
(74) *Attorney, Agent, or Firm* — Kilpatrick Townsend & Stockton LLP (57) ABSTRACT

A method of and an apparatus for controlling the height of a material column in a vessel upstream of a pump, in which method material is conveyed into an upper portion of the vessel, electrical signals are provided on the basis of the presence of material at predetermined measuring levels of the vessel by using a first sensor set disposed at a first measuring level at the upper portion of the vessel and a second sensor set disposed at a second measuring level at the lower portion of the vessel, and material is extracted at a controlled flow speed from a lower portion of the vessel by the pump, wherein the provided electrical signals are used to infer weighting factors of measuring level presence functions, and the flow speed is controlled on the basis of the weighting factors of the measuring level presence functions.

12 Claims, 5 Drawing Sheets

METHOD OF AND APPARATUS FOR CONTROLLING THE HEIGHT OF A COLUMN OF MATERIAL IN A VESSEL UPSTREAM OF A PUMP

CROSS-REFERENCES TO RELATED APPLICATIONS

This application is a National Stage of International Application No. PCT/EP2008/059806 filed Jul. 25, 2008, and which claims the benefit of European Patent Application No. 07113958.8, filed Aug. 7, 2007, the disclosures of which are incorporated herein by reference.

The present invention relates to a method of and apparatus for controlling the height of a column of material in a vessel upstream of a pump. The method and apparatus according to the invention are especially suitable for use in connection with a drop leg upstream of a pump for pumping medium consistency pulp stock, but the invention is, of course, also suitable for use in other corresponding applications, for example, in chemical and mechanical wood processing industry.

A drop leg in a pulp mill has typically a height of more than 4 meters and a diameter from 600 to 1000 mm. Usually, the height/diameter ratio of a drop leg is at least five. When transporting medium consistency pulp stock, i.e., a fiber/air/water suspension with a dry solids content between 8 and 18%, from, e.g., a washer or a thickener through a drop leg arranged upstream of a pump, the pulp stock is fed to the upper portion of the drop leg and conducted to the pump at the lower portion of the drop leg. The stock is usually fed to the drop leg at a high rate, so that the flow-through time of the material through the drop leg is relatively short, causing high turmoil to the stock, i.e., the level of the stock in the drop leg is very uneven and unstable. The stock is usually fairly tacky material, which may bring about bridging of material in the drop leg and momentary sticking of smaller and larger splashes of the stock to the inner walls of the drop leg.

In many pumping applications, it is important to keep the height of a column of material in a vessel upstream of a pump relatively constant or within certain limits. Especially, when conveying medium consistency pulp stock through a drop leg and a pump to a subsequent process stage, controlling of the stock level in the drop leg is needed so as to not allow the level to drop too low or to enter the previous equipment, such as a washer. Thereby a stable operation in the process can be obtained. However, due to the characteristics of the stock in a drop leg, as described above, it is a demanding task to control the level of stock in a drop leg.

A material column height controller comprises generally means for measuring the height of material in a vessel and means for adjusting the flow rate from the vessel so as to keep the level within desired limits. The flow rate through a pump downstream of a vessel can be adjusted by different means, including throttling a control valve, changing the speed of the pump, and applying a combination of these two methods.

Conventionally the level of material in a drop leg has been measured by means of a radioactivity-based method using a gamma ray, by a pressure transmitter, by weighing or by a capacitive or other electrical measurement. The usefulness of radioactive measuring is limited due to strict safety regulations. Hydrostatic pressure reading may lead to erroneous conclusions in case of bridging of material in the drop leg. Weighing needs a flexibly connected measuring vessel, which may be impractical in many applications. Conventional capacitive measurements based on using a vertical array of capacitive sensors may suffer from erroneous level indications due to splashes of material at the positions of individual sensors.

In a capacitive material height measurement, typically an rf-voltage is connected between two electrodes of a capacitor, and the current, which depends on the dielectric constant, or permittivity, of materials between and in the immediate vicinity of the electrodes, is monitored. A varying material surface in the environment of the electrodes brings about a change in the effective permittivity $\in$, and can thus be observed. If the dielectric constant of the material to be monitored is close to that of the vapor phase above the material, the signal change to be observed may be rather small.

An object of the present invention is to provide a method of and an apparatus for controlling the height of a column of a material, especially of a tacky material, in a vessel upstream of a pump.

Another object of the present invention is to provide a method of and an apparatus for measuring the effective height of an unstable or uneven column of material in a vessel upstream of a pump, so as to control the level of material in the vessel.

In order to achieve these and other objects of the present invention, a method is provided, as described in the accompanying claims. Especially, according to an aspect of the present invention, a method of controlling the height of a column of material in a vessel upstream of a pump is provided, in which method (a) material is conveyed into an upper portion of the vessel, (b) electrical signals are provided on the basis of the presence of material at predetermined measuring levels of the vessel by using a first sensor set disposed, at a first measuring level at an upper portion of the vessel and a second sensor set disposed at a second measuring level at a lower portion of the vessel, (c) material is discharged at a controlled flow speed from the lower portion of the vessel by the pump, wherein the electrical signals provided in step (b) are used to infer weighting factors of measuring level presence functions, and in step (c) the flow speed is controlled on the basis of the weighting factors of the measuring level presence functions.

According to another aspect of the present invention, an apparatus for controlling the height of a column of material in a vessel upstream of a pump is provided, which apparatus comprises means for conveying material into an upper portion of the vessel, sensors providing electrical signals on the basis of the presence of material at predetermined measuring levels of the vessel disposed as a first sensor set at a first measuring level at an upper portion of the vessel and as a second sensor set at a second measuring level at a lower portion of the vessel, means for discharging material from the lower portion of the vessel through the pump, and a control unit for controlling the rate of discharging material from the vessel by the pump on the basis of weighting factors of measuring level presence functions inferred from the electrical signals.

According to the present invention, the sensors which are sensitive for the existence of material are mounted at multiple levels, so-called measuring levels, in the vessel. According to a first preferred embodiment of the invention, sensor sets are mounted at two measuring levels in the vessel. In such a case, the sensor sets are positioned at measuring levels which represent the upper and lower limits, respectively, of the desired height of the material column in the vessel.

According to another preferred embodiment of the invention, sensor sets are mounted at four measuring levels in the vessel. In this case, usually two outermost measuring levels represent the upper and lower limits of the desired height, and the two others are in the vicinity, i.e., within about 5% of the height of vessel, of the outermost measuring levels. By having sensor sets also at such additional measuring levels, it is possible to indicate when the surface of material is close to or approaching one of the limits of the desired material height in the vessel. The number of measuring levels can advantageously be even higher than four. According to a preferred embodiment of the present invention, the number of measuring levels is six, whereby three measuring levels are close to the lower limit of the desired height of material and three measuring levels are correspondingly close to the upper limit of the desired height. It is also possible to dispose sensor sets at even more measuring levels, for example, to obtain a more or less continuous indication of the height of material in the vessel.

The present invention is directed especially for controlling the height of a column of tacky, or adhesive, material or a highly unstable and uneven upper surface of material in a vessel. Therefore, it is often not sufficient to monitor the height of a material column by having at each measuring level a single sensor measuring the existence of material at a single spot or in an small area, for example in an area smaller than 5% of a horizontal cross section of the vessel.

According to an aspect of the present invention, monitoring of the height of a material column in a vessel is advantageously made by having at each measuring level a sensor set, which has a cumulative sensing area, i.e., the area where the sensors are capable to reveal the existence of the material in question, extending in a large portion of the cross section of the vessel. Preferably, the sensing area at each measuring level covers at least 10% of the horizontal cross section of the vessel. More preferably the sensors' combined sensing area covers at each measuring level at least 20%, and most preferably at least 40%, of the horizontal cross section of the vessel.

According to another aspect of the present invention, the sensor sets at each measuring level may advantageously comprise multiple sensors, which may have a relatively small sensing area, for example less than 1% of the cross sectional area of measuring level. The number of sensors with a relatively small sensing area at each detection level is preferably three, but it may advantageously be also four or five, or even more. When the material height measuring system comprises multiple measuring levels in vicinity of each other, the number of sensors, with a relatively small sensing area, at the measuring levels can in some cases be less than three, however, advantageously it is at least two. In this specification, sensors are defined to be at the same measuring level if they are mounted exactly at the same vertical level, or at horizontal levels which are close to each other, typically within about 2% of the height of the vessel.

The sensors can advantageously be resistive sensors, which are in electrical contact with the material in the vessel and measure changes of electrical conductivity between or in the close vicinity of a pair of electrodes of the sensors. Alternatively, the sensors can be capacitive sensors, which can be electrically isolated from the material and measure changes of permittivity between or in the close vicinity of the two electrodes of the sensor. Resistive sensors can be used only for monitoring the height of a column of conductive material, but capacitive sensors can be used both for conductive and dielectric materials. The sensors can also be of other known sensor types, for example thermal sensors, which form a signal on the basis of the cooling of the sensor provided by the existence of materials in contact with the sensor.

When using a resistive sensor, the measuring current is spread to an area mainly between the electrodes of the sensor. If the electrodes are on the opposite sides of the measured vessel, the current distributes to a large portion of the cross section of the vessel. If the electrodes are close to each other, for example, if they are both within a compact sensor unit, the sensing area of the sensor can be a very small. Correspondingly, other material indicating sensors have an effective sensing area which can vary in size, depending on the measuring principle and geometry of the sensor.

The actual procedure to be used for inferring and controlling the height of the material column in the vessel on the basis of the signals from the sensors depends advantageously on the characteristics of the process to be controlled. For example, if the material is very tacky, the probability of splashes adhering on the sensors may be very high, which is advantageously taken into account in the inferring procedure. Correspondingly, if the material is especially prone to bridging, it should preferably be observed in the controlling process. If the flow velocity used is very high, and it is known that the surface of material is very unstable, it may also affect the method of inferring the actual height of material in the vessel. An advantageous way of observing the characteristics of the process is to use the well-known principles of fuzzy control methods to control the height of material in the vessel.

In a fuzzy control, it is acknowledged that the information of the process is uncertain, and the control of a process is performed on the basis of a set of rules, which are usually done by an experienced operator. The possible states of the process are described by membership functions, and the input signals are tested to obtain the actual weighting factors of each of the membership functions. The obtained weighting factors then determine the firing strength of each of a set of rules to arrive at a combined final control action.

Assuming that the prevailing height of material, and possibly the rate of change of the height of material are known, the principles of controlling the height of material may be fairly straightforward. If the upper surface of material is detected to be at or below the lower limit of the desired material height, the flow speed of material from the vessel is preferably adjusted to its lowest possible value, most preferably to zero. Correspondingly, if the surface of material is detected to be at or above the upper limit of the desired material height, the flow speed is preferably adjusted to a very high value, most preferably to its maximum value. If the height of material is close, but not above the lower limit, the flow speed is preferably adjusted to a low value, which, however, may be higher than its lowest possible value. Correspondingly, if the height of material is close, but below the upper limit, the flow speed is preferably adjusted to a high value, which, however, may be lower than its maximum value.

In case where, on the basis of consecutive material height indications at one or more measuring levels within the limits of desired height, a rapid change of the height of material is observed, the flow speed is advantageously changed so as to suppress the rate of change. When a rapid change of height is observed and the height is approaching the lower or upper limits of the desired height, the correcting action is enhanced, in order to keep the height of material within the desired limits.

As indicated above, the actual procedure to be used for inferring the prevailing height of material, for controlling the height, may depend on the characteristics of the material flow in question. Below is given an exemplary procedure, which can be used for inferring the prevailing or effective height of material. This procedure, however, shall not be understood to be generally valid in all applications.

In a simple case, each sensor below a certain height gives a clear "on" signal, and each sensor above the height gives a clear "off" signal. Thereby, the prevailing height of material can be unambiguously inferred to be between the lowest measuring level giving an "off" signal and the highest measuring level giving an "on" signal. However, the situation is more complicated if at each measuring level there are multiple sensors, and they give signals which are contradictory with each other, or if a measuring level comprises a sensor, which may have a large sensing area, giving an intermediate signal, i.e., a signal which is between those obtained in cases of full presence and absence of material at the sensing area. The situation may be even more complicated if sensors at consequent measuring levels give contradictory results, for example, that material seems to be present at a certain measuring level, but absent at a lower measuring level. It is also possible that the signals from the sensors are contradictory with the earlier inferred height of material.

When the actual upper surface of material is close to a measuring level, the sensor set at that level may provide combined signal which is between full "on" and "off" signals. Such uncertain indications are provided especially when the upper surface of the material is uneven or very unstable. In the following, the presence of material at a measuring level is described by a weighting factor, i.e., a number between zero and one, of a so-called measuring level presence function. For example, a weighting factor W=0.25 of a measuring level presence function may indicate that 25% of the sensors at that measuring level indicate the presence of material, but 75% of the sensors indicate the absence of material. Alternatively, a weighting factor W=0.25 may indicate that a sensor, which may have a large sensing area, gives a signal deviating from the "off" signal towards the "on" signal by an amount which corresponds to 25% of the difference between "on" and "off" signals. For example, if "off" corresponds to 2.0 V and "on" corresponds to 6.0 V, a voltage of 3.0 V may be called a 25% signal giving a weighting factor 0.25 for the presence function of material at that measuring level. When the signal is known to depend non-linearly on the actual amount of material in the vicinity of the sensor, this is advantageously taken into account in the procedure for determining the weighting factors.

According to a simple procedure, the flow speed of material from the vessel is adjusted directly on the basis of the weighting factors of the measuring level presence functions. In the following it is assumed that the presence functions of the measuring level at the upper limit of the desired height of material and of another measuring level slightly below the upper limit have weighting factors W1 and W2, respectively, and the presence functions of the measuring level at the lower limit of the desired height of material and of another measuring level slightly above the lower limit, have weighting factors W4 and W3, respectively. For example, weighting factors W1=0.0, W2=0.0, W3=1.0 and W4=1.0 indicate clearly that the height of the material is between the measuring levels of W2 and W3. However, intermediate weighting factors, for example, W1=0.25, W2=0.50, W3=1.0 and W4=1.0 indicate that there is some material at the levels of W1 and W2, but the actual height of the material is uncertain. An exemplary rule for calculating the desired flow speed (FS) of material from the vessel is $$FS=10*(2*W1+3*W2+3*W3+2*W4). \quad (A)$$

With this rule, the desired flow speed is 100 for a case where the height of material is above the highest measuring level and zero when the height of material is below the lowest measuring level. In the case of the first example above, the flow speed is 50, and in the second example 70. This simple rule can be adjusted by varying the multipliers of the weighting factors W1-W4 in the formula (A).

If desired, more complex rules for calculating the desired flow speed than that given above can be relatively easily formulated. One preferred type of possible more complex rules is related to neglecting the effect of inadequate signals due to isolated splashes or bridging of material in the vessel. For example, a weighting factor of a measuring level presence function that is larger than the weighting factors of two lower measuring levels could be identified to be caused by splashes. Such weighting factor may advantageously be replaced, for example, by the weighting factor of an adjacent lower measuring level. Correspondingly, a weighting factor of a measuring level presence function that is smaller than the weighting factors of two higher measuring levels could be identified to be caused by bridging. Such weighting factor could advantageously be replaced, for example, by the weighting factor of an adjacent higher measuring level.

Another preferred type of more complex rules includes observing the rate of height change of material on the basis of the changes of the weighting factors of the material presence functions of the measuring levels. For example, if the sum of the weighting factors in two consecutive measurement cycles is increased by a given value, say 0.5, the desired flow speed is increased by a certain amount. Correspondingly, if the sum of the weighting factors in two consecutive measurement cycles is decreased by a given value, say 0.5, the desired flow speed is decreased by a certain amount.

In the following, the method and apparatus according to the invention are described in more detail, with reference to the appended drawings, in which.

Figure 1:
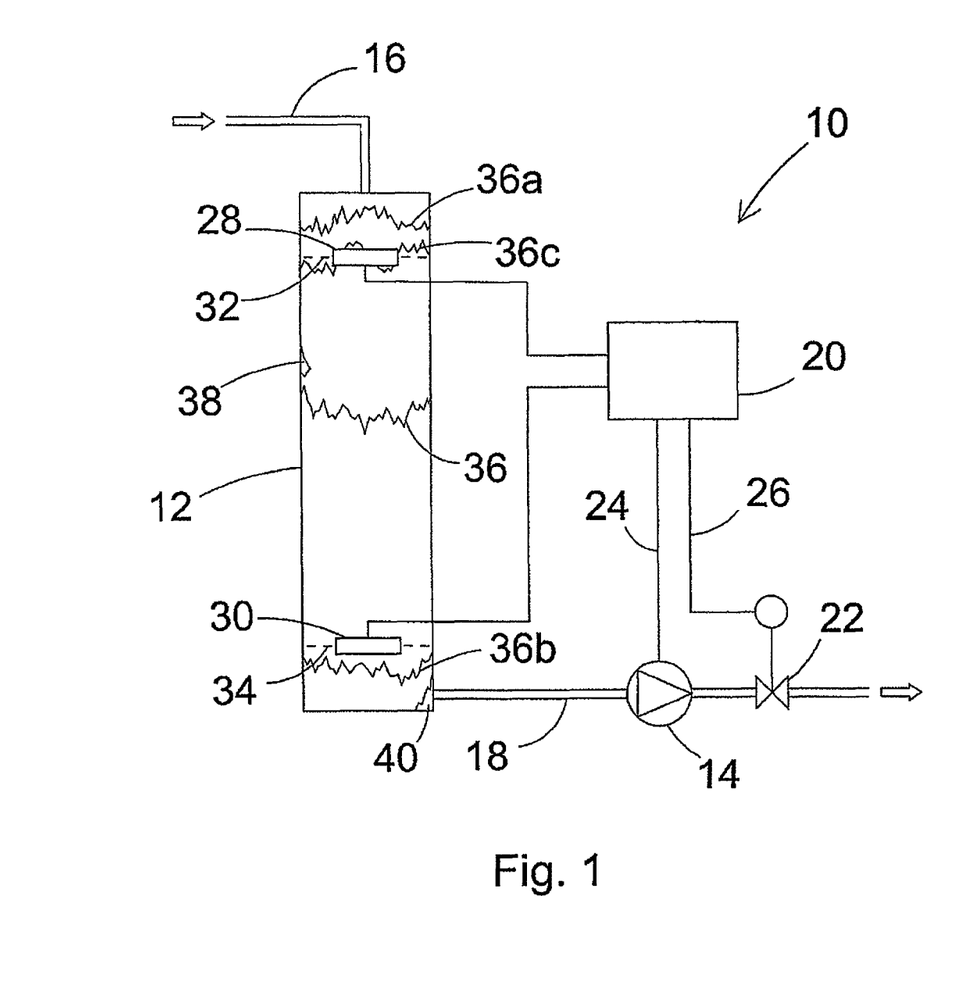
FIG. 1 illustrates schematically an apparatus for controlling the height of material in a vessel upstream of a pump, according to a preferred embodiment of the invention.

FIG. 1 schematically shows an apparatus 10 for controlling the height of a material column in a drop leg 12 upstream of a pump 14, according to a preferred embodiment of the present invention. The drop leg is usually at least 4 meters high, but in different applications the height may vary from less than 2 meters to more than 10 meters. The diameter of the drop leg is usually from about 600 mm to about 1000 mm, but it may also be different, for example, from 500 mm to 1500 mm. Typically the ratio height/diameter of a drop leg is more than 5.

A feed channel 16 is connected to the upper portion of the drop leg 12, through which feed channel 16 a stream of material is introduced into the drop leg. The introduced material is from a previous process stage, such as a washer or a thickener of a pulp mill, which is not shown in FIG. 1. A discharge channel 18 is connected to the lower portion of the drop leg 12, through which discharge channel 18 material is discharged from the drop leg to the pump 14. The material is discharged from the drop leg 12 at a flow rate, which is controlled by a control unit 20. The control unit 20 is connected to the pump 14 and/or to a valve 22 in the discharge channel 18 by connections 24 and 26, respectively, so as to control the flow rate of material from the drop leg 12. The controlling is performed by varying the speed of the pump 14 or by throttling the valve 22 or as a combination of these methods.

The controlling by the control unit 20 is based on measuring the height of the material in the drop leg 12 by sensors 28, 30 located in the measuring levels 32, 34 in the drop leg. The two measuring levels represent the upper and lower limits of the desired height of material in the drop leg 12. The sensors 28, 30 may be electrical sensors, such as capacitive sensors or resistive sensors, and are preferably sensitive to the existence of material at a large portion of the cross section of the drop leg 12 at the measuring levels 32, 34.

When the upper surface of the material 36 in the drop leg 12 is, for example, between the measuring levels 32 and 34, the lower sensor 30 sends an "on" signal, i.e. an electrical signal which clearly indicates that the sensor 30 is completely in contact with the material, and the upper sensor 28, correspondingly, sends an "off" signal. In case both of the sensors are sending an "on" signal, the height of material column in the drop leg 12 is obviously above the upper limit of the desired height of material, as indicated by a line 36a in FIG. 1. In order to prevent the surface of the material from rising to the previous process step, the flow rate at the discharge channel is then usually increased to its maximum value. Correspondingly, when both sensors are sending an "off" signal, the height of material seems to be below the lower limit, corresponding to line 36b in FIG. 1, and the flow rate is usually reduced to its minimum value.

The situation is more complicated, when a fluctuating upper surface of material is close to one of the sensors, such as line 36c in FIG. 1, and the sensor sends a signal which has a value between those of the "on" and "off" signals. In such cases the control action can be advantageously calculated in the control unit on the basis of appropriate rules, preferably by using fuzzy logic. The inferring of the actual height of material in the drop leg 12 can be confused also by splashes 38 and cavities 40 of the material when such appear in the sensing area of a sensor.

In order to facilitate the inferring of the height of material in the drop leg 12, the sensors should preferably have a sensing area which extends to at least 10%, more preferably to at least 20%, and even more preferably to at least 40% of the cross section of the drop leg at each measuring level. According to another embodiment of the present invention, at each of the measuring levels are mounted more than one sensors, preferably at least three sensors, and the actual level of material is inferred on the basis of the signals from the multiple sensors at each measuring level.

Figure 2:
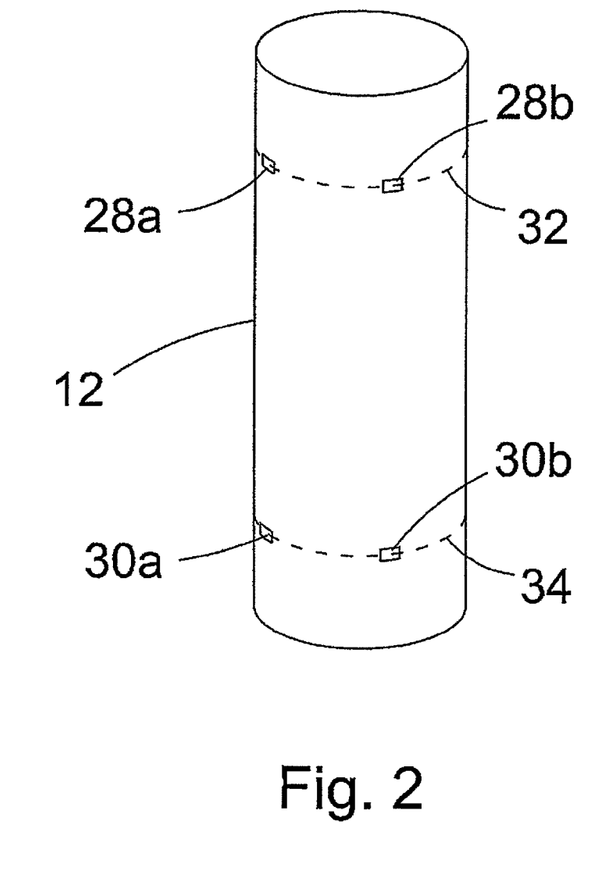
FIG. 2 illustrates schematically a plan view of a vessel, showing the locations of sensors according to a second preferred embodiment of the invention.
Figure 3:
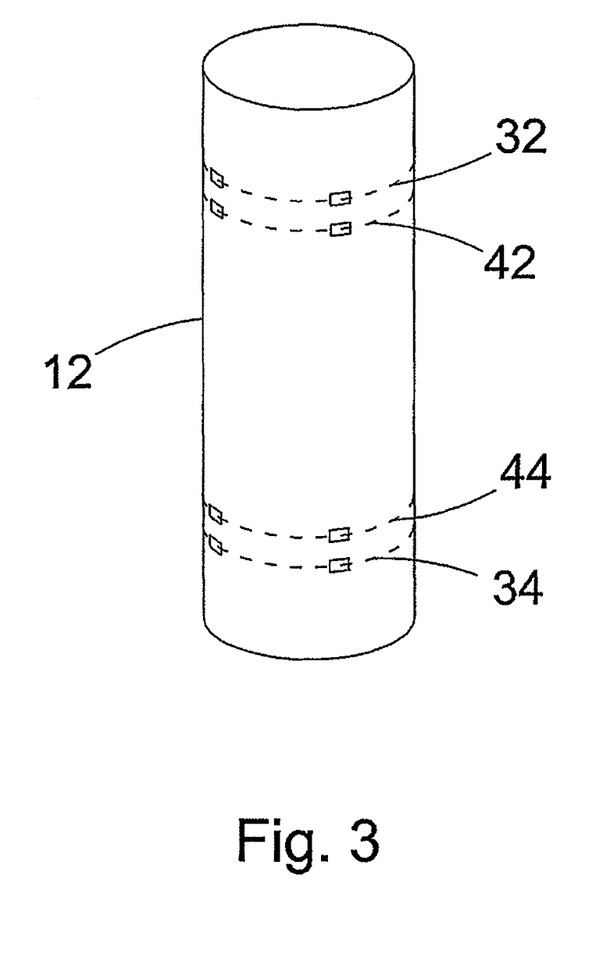
FIG. 3 illustrates schematically a plan view of a vessel, showing the locations of sensors according to a third preferred embodiment of the invention.
Figure 4:
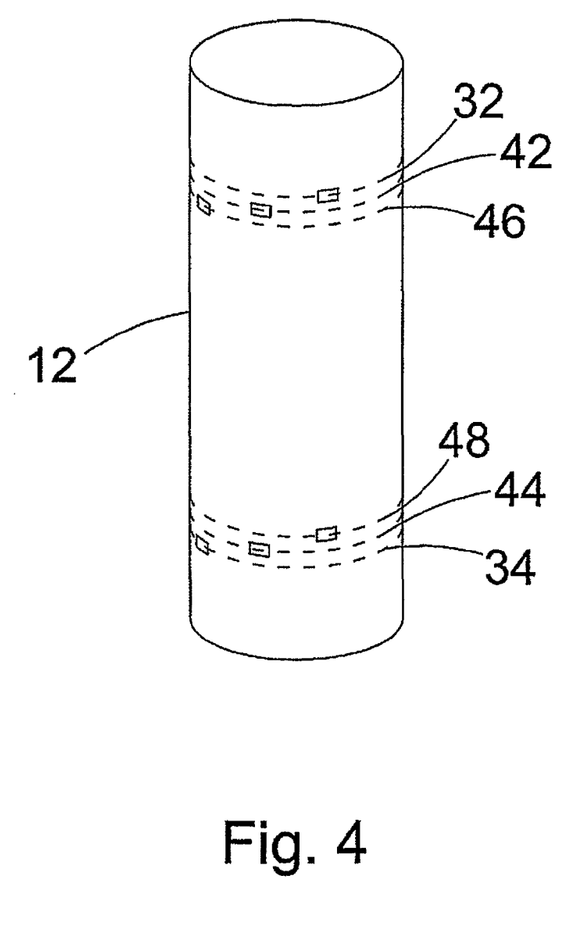
FIG. 4 illustrates schematically a plan view of a vessel, showing the locations of sensors according to a fourth preferred embodiment of the invention.
Figure 5:
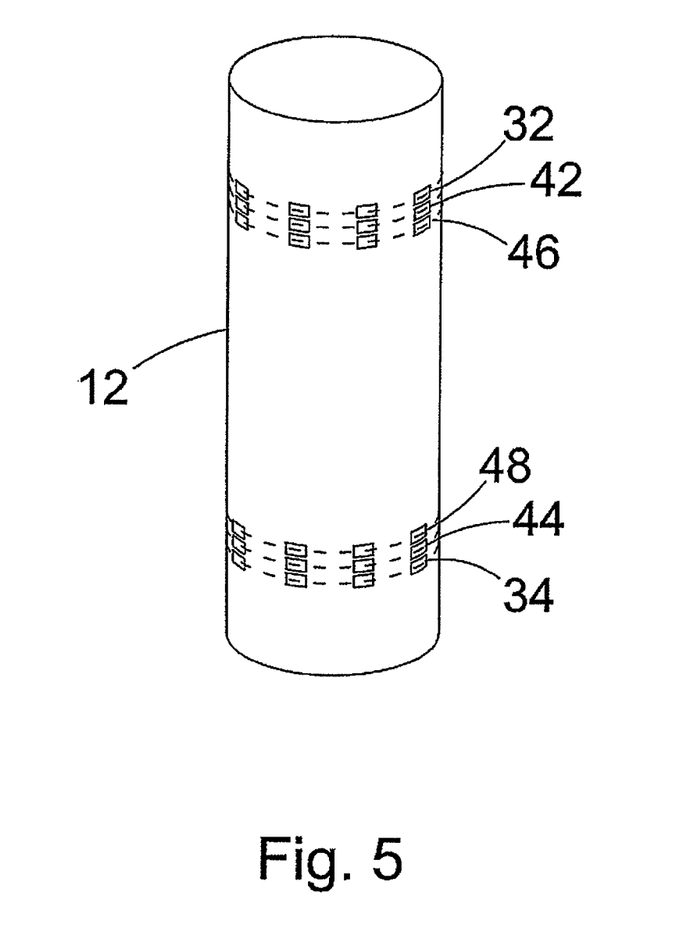
FIG. 5 illustrates schematically a plan view of a vessel, showing the locations of sensors according to a fifth preferred embodiment of the invention.

FIGS. 2-5 show different preferred embodiments of the present invention, where at each measuring level are mounted several sensors, which may have a relatively small sensing area. The number of measuring levels may be two, as is shown in FIGS. 1 and 2, but preferably it is higher than two, as is shown in FIGS. 3-5. Preferably the apparatus comprises sensors at at least two or three measuring levels close to both the upper and lower limits of the desired height of material in the drop leg.

FIG. 2 shows a plan view of a preferred embodiment of the present invention, where a set of two sensors 28a, 28b are seen at a measuring level 32 corresponding to upper limit of the desired height of material and other two sensors 30a, 30b at a measuring level 34 corresponding to lower limit of the desired height of material. The sensor sets at the measuring levels 32 and 34 may advantageously comprise two further sensors mounted on the backside of the drop leg, not shown in FIG. 2. In this case, the presence of material at each measuring level is concluded as an average result of the signals from the set of sensors at the measuring level, and the controlling action is based on the signals from all the measuring levels, advantageously by using fuzzy logic.

FIG. 3 corresponds otherwise to FIG. 2, but there are sensor sets also at two additional measuring levels 42, 44, which are slightly below the upper measuring level 32 and above the lower measuring level 34, respectively. With the sensor sets at the additional measuring levels it is possible to observe when the upper surface of material is close or approaching one of the limits of the desired height of material.

FIG. 4 shows a further preferred embodiment of the present invention, where there are sensor sets at two measuring levels 42, 46 slightly below the upper limit 32, and at two levels 44, 48, slightly above the lower limit 34. In FIG. 4, there is seen only one sensor at each measuring level, but it is to be understood that there are other sensors at each measuring level at the backside of the drop leg 12. The number of sensors at each measuring level can be reduced, when there are multiple consequent measuring levels close to each others.

By having sensor sets at at least three adjacent measuring levels, it is possible to observe the bridging or splashing of material, and neglect them in determining the flow speed of material from the drop leg. The number of measuring levels can advantageously be even larger than three close to the upper and lower limits. With more measuring levels it is especially possible to observe the rate of change of the height of material in the drop leg. A rapid increase or decrease of the height is preferably slowed down by increasing or decreasing, respectively, the flow speed of material from the drop leg. Such a slowing down of the change of the height of material is especially advantageous, when the height of the material is close to the upper or lower limit of the desired height.

FIG. 5 shows a still further preferred embodiment of the present invention, where there are as many measuring levels as in FIG. 4, but the number of sensors in each sensor set is large. This type of measuring system is quite expensive, but it may be used when high turmoil of material in the drop leg is expected, and/or a good accuracy of the height control is required.

It should be noted from the above disclosure that the invention has only been described with reference to a few exemplary solutions. These solutions are not intended as limiting the invention only to the above-mentioned details, but the invention is limited only by the appended claims and the definitions therein.

We claim:

1. A method of controlling the height of a material column in a vessel upstream of a pump comprising:
   a) material is conveyed into an upper portion of the vessel;
   b) electrical signals are provided on the basis of the presence of material at predetermined measuring levels of the vessel by using a first sensor set disposed at a first measuring level at an upper portion of the vessel and a second sensor set disposed at a second measuring level at a lower portion of the vessel; and
   c) material is discharged at a controlled flow speed from the lower portion of the vessel by the pump,
   wherein the electrical signals provided in step (b) are used to infer weighting factors of measuring level presence functions describing the presence of material at the respective measuring level, with the weighing factors having a range of values including a value respectively for full presence and absence of material and intermediate values in between, wherein the weighting factors of measuring level presence functions are corrected to neglect the effect of bridging of material in the vessel,
wherein the material comprises medium consistency pulp stock, and
wherein in step (c) the flow speed is controlled on the basis of the weighting factors of the measuring level presence functions.

2. A method according to claim 1, wherein the weighting factors of measuring level presence functions are further corrected to neglect the effect of splashes of material in the vessel.

3. A method according to claim 1, wherein in step (c) the flow speed is controlled on the basis of the changes of consecutive weighting factors of the measuring level presence functions.

4. A method according to claim 1, wherein in step (c) the flow speed is controlled by using fuzzy control.

5. A method according to claim 1, wherein in step (b) electrical signals are provided on the basis of the presence of material by using a third sensor set disposed at a third measuring level in the vicinity of said first measuring level and a fourth sensor set disposed at a fourth measuring level in the vicinity of said second measuring level.

6. A method according to claim 5, wherein in step (b) electrical signals are provided on the basis of the presence of material by using a fifth sensor set disposed at a fifth measuring level in the vicinity of said third measuring level and a sixth sensor set disposed at a sixth measuring level in the vicinity of said fourth measuring level.

7. A method according to claim 1, wherein at least one of said sensor sets has a sensing area which covers at least 10% of the cross sectional area of the vessel.

8. A method according to claim 7, wherein at least one of said sensor sets has a sensing area which covers at least 20% of the cross sectional area of the vessel.

9. A method according to claim 8, wherein at least one of said sensor sets has a sensing area which covers at least 40% of the cross sectional area of the vessel.

10. A method according to claim 5, wherein at least one of said sensor sets comprises at least two sensors.

11. A method according to claim 1, wherein at least one of said sensor sets comprises at least three sensors.

12. A method according to claim 11, wherein at least one of said sensor sets comprises at least four sensors.

* * * * *